April 7, 1936.  L. M. SIEMON  2,036,547

BATTERY RECONDITIONER

Filed July 9, 1935

Inventor
Lester M. Siemon.
By John J. Thompson
Attorney

Patented Apr. 7, 1936

2,036,547

UNITED STATES PATENT OFFICE 2,036,547

BATTERY RECONDITIONER

Lester M. Siemon, Woodmont, Conn.

Application July 9, 1935, Serial No. 30,463

1 Claim. (Cl. 171—314)

This invention relates to a battery reconditioning device and is intended primarily to be installed or attached to and operated by the electrical system or storage battery of an automobile or other vehicle, for reconditioning the dry cells of flash lights and the like, although it may be employed for other purposes and operated from other sources of electrical current.

In the use of flash lights by electricians, linemen, meter readers etc., it is found that the dry cells soon become run down and often have to be replaced after a few hours use, which necessitates a return to the shop or office for a new supply or the carrying of extra cells.

To overcome this, I have devised a reviver, that can be readily attached to the mechanic's automobile and which will revive one set of dry cells while he is using the other set, as it only requires a short time to recondition dry cells to give them many additional hours of service, and the operation may be repeated several times.

The object of the invention is to provide a compact, simple, durable and efficient device for this purpose and one that may readily be plugged into a dash light socket on the instrument board of an automobile or other vehicle.

Another object of the invention is to provide in a device of this kind means whereby the conditioning rate may be regulated.

Another object of the invention is to provide a device of this kind in which one or more dry cells may be inserted therein and revived from any automobile electric circuit or storage battery by the use of the proper capacity of candle power bulbs placed in the device to act as resistors.

Another object of the device is to provide means whereby dry cells of larger capacity may be attached to the binding posts for recharging from the current derived from the 6–8 volt system of the automobile.

Another object of the invention is to provide means for attaching the device to the automobile or other object.

With these and other objects in view, my invention consists in certain novel construction and combination of parts as will hereinafter be fully described and claimed and further illustrated in the accompanying drawing which forms a part hereof and in which like figures of reference refer to corresponding parts in all of the views and it is understood that slight changes may be made without departing from the spirit of the invention.

Figure 1:
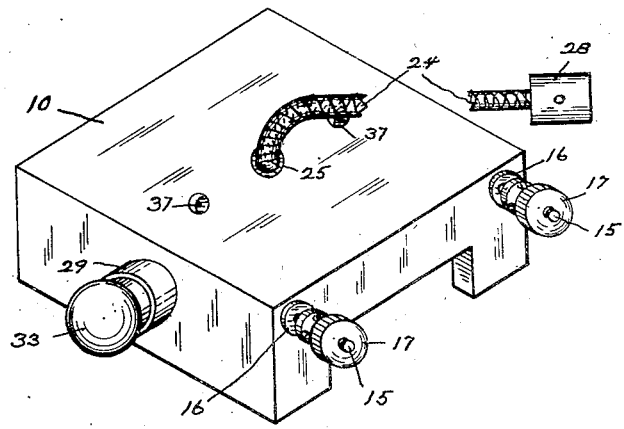
Figure 1 is a perspective view of the device.
Figure 2:
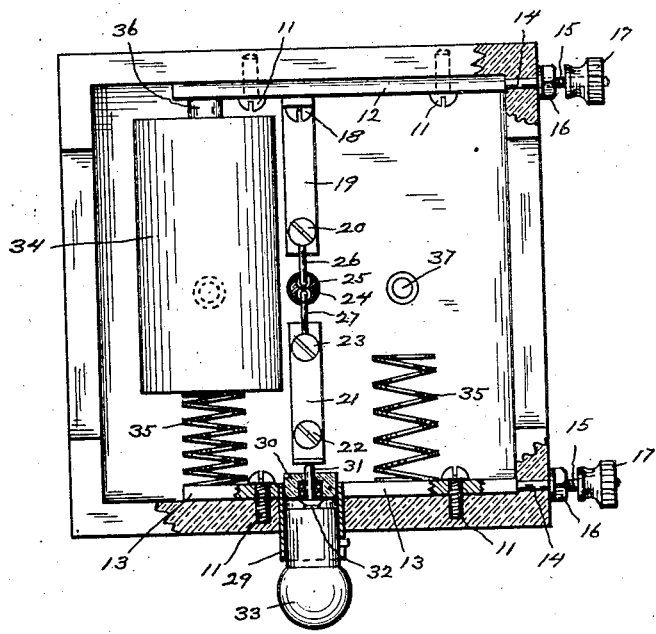
Figure 2 is a bottom view, partly in section to show the construction and arrangement of the parts.

As herewith shown and described, the device 5 is composed of a box-shaped casing 10 of insulating material and within which is molded or secured by the screws 11, the two electrical conductor bars 12 and 13; one of the ends 14 of which extends through the side of the casing 10 and is threaded as at 15 for the locking nut 16 and the binding nuts 17, which provide terminals which may be connected to a storage battery or other current supply of greater capacity than that of the dry cells to be revived.

To the conductor bar 12 is attached by the screw 18 or other means, one end of a conductor 19 which is mounted in the casing 10 by the screw 20 which also acts as a binding screw.

In aligned relation to the conductor 19 is a second conductor 21 secured to the casing 10 by the screw 22 and the screw 23 which also acts as a binding screw.

These conductors 12, 13, 19 and 21 are supplied with direct electrical current by a cable 24, the end of which enters the casing 10 through the opening 25 therein and its wires 26 and 27 are attached to the conductors 19 and 21 by the screws 20 and 23; the other end of said cable 24 having a standard plug 28 for attachment to the regular socket on the automobile dash.

Within the side of the casing 10 and in electrical contact with the conductor 13, is mounted a tubular bulb socket 29 of the usual type having in the inner end thereof an insulating plug 30 carrying a contact plunger 31 which contacts with both the end of the conductor 21 and with the center contact 32 of the light bulb 33 bulbs of different voltages being used to regulate the charging rate; the circuit being completed by the side of the bulb base and the socket 29.

For detachably and removably retaining the dry cells 34 within the casing 10 during their reconditioning, there are provided the contact springs 35 which have one of their ends secured to the conductor 13 and their free ends in contact with the bottom of the dry cells 34; while the contact 36 on the upper end of the dry cells 34 is held in frictional contact with the conductor 12 by the action of said springs.

Having thus described my invention, what I claim as new and desire to secure by Letters Patent, is:

In a dry cell reconditioner of the class described, the combination with a box-shaped casing of insulating material, a pair of parallel electrical conductors mounted within the sides of said casing in opposed relation to each other, binding posts formed on one end of each of said conductors and projecting through the side of said casing, a pair of electrical terminals mounted within a top of said casing and insulated from each other, one of said terminals connected to one of said conductors, and both of said terminals connected to an electrical current supply, an electrical lighting bulb and bulb socket mounted in the side of said casing the central contact of the socket connected to the second terminal and the other contact of the socket connected to the second conductor for completing the electrical circuit between the second terminal and the second conductor, and a pair of spring contacts each having one end connected to the second conductor for retaining a dry cell in contact with both of said conductors.

LESTER M. SIEMON.